United States Patent

[11] 3,558,804

[72] Inventors Peter Johannes Hubertus Janssen; Wouter Smeulers; Wilhelmus Martinus Mathijssen, Emmasingel, Eindhoven, Netherlands

[21] Appl. No. 653,253
[22] Filed July 13, 1967
[45] Patented Jan. 26, 1971
[73] Assignee U.S. Philips Corporation New York, N.Y. a corporation of Delaware. by mesne assignments
[32] Priority July 1, 1967
[33] Netherlands
[31] 6709190

[54] AGC CIRCUIT FOR A COLOR TELEVISION RECEIVER
5 Claims, 8 Drawing Figs.

[52] U.S. Cl. .......... 178/5.4
[51] Int. Cl. .......... H04n 9/48
[50] Field of Search .......... 178/5.4CK, 5.4ACC, 5.4MC, 69.5CB

[56] References Cited

UNITED STATES PATENTS

| | | | |
|---|---|---|---|
| 2,835,728 | 5/1958 | Flood et al. | 178/5.4CK |
| 2,835,729 | 5/1958 | Flood | 178/5.4CK |
| 2,908,748 | 10/1959 | Macouski | 178/5.4ACC |
| 2,913,519 | 11/1959 | Macouski et al. | 178/5.4CK |
| 3,368,030 | 2/1968 | Wiencek | 178/5.4ACC |

*Primary Examiner*—Richard Murray
*Assistant Examiner*—George G. Stellar
*Attorney*—Frank R. Trifari

ABSTRACT: A color television receiver has a color channel which includes two parallel signal paths and means for switching the signal paths so that the color information signals pass only one path and reference carrier signals pass only to other paths. The color signal path includes adjustable attenuator for adjusting the ratio between the color signals and reference signals. A control voltage derived from the reference signals is continuously applied to a controlled amplifier outside of the switched paths in order that the ratio is not affected by the control voltage.

INVENTORS
PETER J. H. JANSSEN
WOUTER SMEULERS
BY WILHELMUS M. MATHIJSSEN
AGENT

INVENTOR.
PETER J. H. JANSSEN
WOUTER SMEULERS
WILHELMUS M. MATHIJSSEN
BY
Frank R. Trifari
AGENT INVENTORS
PETER J.H. JANSSEN
WOUTER SMEULERS
WILHELMUS M. MATHIJSSEN
BY
Frank R. Trifari
AGENT

AGC CIRCUIT FOR A COLOR TELEVISION RECEIVER

This invention relates to a color television receiver for a color television signal comprising a video signal modulated on a carrier, and the video signal including at least a luminance signal, a color information signal modulated on a color subcarrier, and a burst reference signal modulated on the color subcarrier, the receiver including an automatic gain control circuit the control voltage for which is derived from control signals obtained from the reference signal and also including a device for adjusting the amplitude of at least the color information signal, said device including a transmission channel through which at least the color information signal and the reference signal are transmitted and the transmission of which channel can be switched periodically by means of a switching device, so that the transmission of the transmission channel can be influenced by the adjustment of the adjusting device during the occurrence of the color information signal, but cannot substantially be influenced during the occurrence of the reference signal.

A color television receiver of the above kind is known from U.S. Pat. No. 3,342,930 in which during the occurrence of the burst reference signal the control voltage derived from this signal and during the occurrence of the color information signal an adjusting voltage obtained from an adjusting member in the adjusting device is applied to the suppressor grid of a pentode amplifying tube through which the color information signal and the reference signal (burst signal) pass.

Such a receiver affords the advantage that the reference signal from which, for example, a control voltage for an automatic phase control is usually derived, remains of constant magnitude at the output of an amplifier following the said amplifying tube. A very satisfactory compensation of phase is thus obtainable, irrespective of variations in the amplitude of the signal applied to the amplifying tube. However, the known receiver has the disadvantage that, while the color information signal is passing through the amplifying tube, an automatic gain control is not active so that variations in the amplitude of this signal result in variations in the color saturation of the displayed picture.

An object of the invention is to obviate this disadvantage while obtaining further advantages.

A color television receiver according to the invention of the kind mentioned in the preamble is characterized in that the said control voltage is supplied to the automatic gain control circuit, outside the switching device, during the occurrence of both the reference signal and the color information signal, so that the switchable transmission of the transmission channel permits of obtaining a ratio between the transmission during the occurrence of the reference signal and the transmission during the occurrence of the color information signal which can be adjusted by the adjusting member and is independent of the control voltage.

Since the control voltage is applied to the automatic gain control circuit outside the switching device, the automatic gain control is active during both the reference signal and the color information signal, while the time-dependent transmission by means of the switching device is still obtained. Thus an adjustment of saturation is possible which is not influenced by the automatic gain control.

A further feature of a color television receiver according to the invention is that, in order to obtain a combined adjustment of contrast and saturation, at least the video signal is passed through the transmission channel with the transmission which can be switched periodically.

In such a receiver the contrast and the saturation can be adjusted simultaneously in a simple manner by only one adjusting control while retaining the action of the automatic gain control which is actuated by the control voltage derived from the reference signals.

In order that the invention may be readily carried into effect it will now be described in detail, by way of example, with reference to the accompanying diagrammatic drawings, in which.

Figure 1:
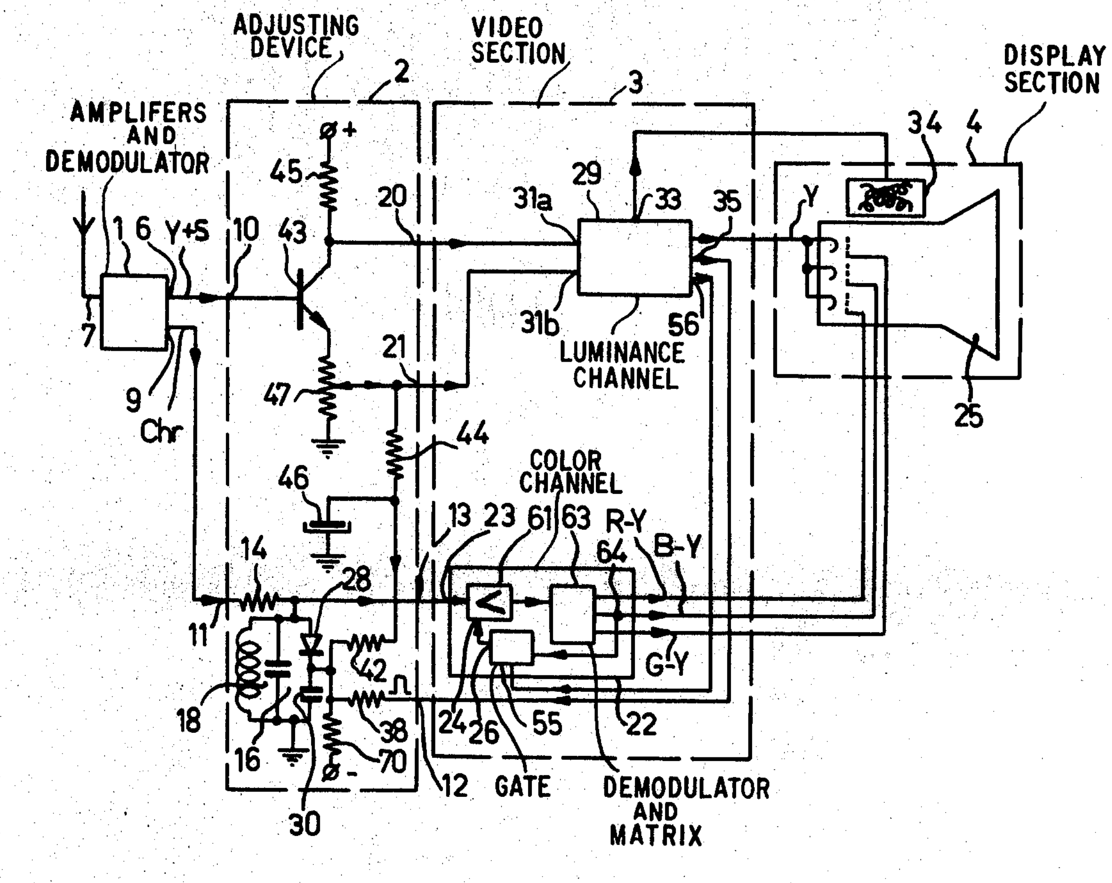
FIG. 1 shows a simplified block diagram of a color television receiver according to the invention, the color information signal and the reference signal only passing through a transmission channel having a time-dependent transmission.

The receiver shown in FIG. 1 comprises a section 1, an adjusting device 2, a video section 3 and a display section 4.

The section 1 comprises, for example, the usual high frequency and intermediate frequency stages (not shown) and a demodulator (likewise not shown) for amplification and demodulation, respectively of a video signal modulated on a carrier and received through an input 7. Such a video signal comprises a luminance signal Y and a synchronization signal S which together are supplied through an output 6 to an input 10 of the adjusting device 2. The video signal further comprises a color information signal and a reference signal which are both modulated on a subcarrier. The subcarrier thus modulated is supplied through an output 9 to an input 11 of the adjusting device 2.

The adjusting device 2 includes an output 13 at which the signal supplied to the input 11 becomes available in such manner that the amplitude of the color information signal is adjustable by means of an adjusting member 47, and that the amplitude of the reference signal is not adjustable by means of said adjusting member 47. For that purpose a transmission channel is situated between the input 11 and the output 13 the transmission of which channel can be switched periodically with the aid of a keying or time-selection signal supplied to an input 12 of the adjusting device 2. This keying signal supplied to the input 12 which is positive every time during the occurrence of the reference signal, controls a potentiometer formed by a resistor 14 and a voltage-dependent impedance 16, which potentiometer is connected between the input 11 and the output 13. The voltage-dependent impedance 16 is formed by a parallel circuit 18 tuned to the subcarrier and a series arrangement of a diode 28 and a capacitor 30 connected in parallel thereto. The keying voltage, which is positive during the occurrence of the reference signal is supplied through a resistor 38 to the junction of the cathode of the diode 28 and the capacitor 30, which capacitor forms a low impedance for the color subcarrier frequency, and a negative DC voltage adjustable by means of the adjusting member 47 is supplied to said junction through a potentiometer with a resistor 42 and a resistor 70 which is connected to a negative voltage source. Said adjustable negative DC voltage is obtained as follows: As a result of a current flowing through a transistor 43, an adjustable positive voltage appears at the adjustable tapping of the adjusting member 47 incorporated in the emitter line of said transistor. The adjustable tapping of the adjusting member 47 is connected, through a potentiometer constituted by a series arrangement of a plurality of resistors 44, 42 and 70, to a negative voltage source. By correct choice of said resistors, a negative voltage, which can be adjusted by means of the adjusting member 47, then appears at the junction of the resistors 42 and 70. Due to the coaction of the voltages supplied through the resistors 38,42,70 a voltage appears at the cathode of the diode 28 so that the diode 28, the anode of which is connected to earth through the coil of the circuit 18, is conducting during the occurrence of the color information signal to an extent determined by the adjustment of the adjusting member 47. During the occurrence of the reference signal the diode 28, which forms a switching device, does not conduct as a result of the positive voltage pulse supplied through the resistor 38.

As a result of the curve of the characteristic of the diode 28 the transmission from the input 11 to the output 13 during the occurrence of the color information signal shows a value which is determined by the extent of conductivity of the diode 28 and which is thus dependent on the adjustment of the adjusting member 47. Thus the color saturation can be adjusted in the picture to be displayed by means of the adjusting member 47.

During the period of time that the reference signal is transmitted, the diode 28 does not conduct and thus the transmission from the input 11 to the output 13 is independent of the adjustment of the adjusting member 47. According to the invention said transmission is thus independent of an automatic gain control voltage which is derived from the reference signal. Said control voltage, which will again be discussed hereinafter, is supplied according to the invention, outside the described switching device formed by the diode 28, to an automatic gain control circuit and does not influence the transmission of the transmission channel between the input 11 and the output 13, but is active during the occurrence of both the color information signal and the reference signal. As a result fluctuations of color saturation in the picture displayed by the receiver as a result of variations in the received signal are prevented. The amplitude ratio between the reference signal and the color information signal in the transmission channel between the input 11 and the output 13 can be adjusted by means of the adjusting member 47 to a value which is only determined by the adjustment of said adjusting member. An automatic gain control which, according to the invention, is active during the whole signal can no longer influence this ratio, which is also the situation in the received signal although at a different ratio. The automatic gain control, which is controlled by the reference signal, keeps this reference signal constant and therefore also keeps the color information signal constant, namely at a value determined by the adjustment of the adjusting member 47.

The luminance signal Y and the synchronization signal S appear through the input 10 of the adjusting device 2 at the base of the transistor 43 and thus across an emitter resistor 47 and a collector resistor 45 which are connected to said transistor 43. The collector is further connected to an output 20 of the adjusting device 2 from which a signal can be derived which is not adjustable in amplitude. The emitter resistor 47 is the adjusting member described above and its adjustable tap is connected to an output 21 of the adjusting device 2 and through an RC filter 44,46 serving as a smoothing filter for the above-described voltage supply to the resistor 42 for the switching and transmission adjusting diode 28. Besides the mentioned DC voltage for adjustment of the saturation also a luminance signal which is adjustable in amplitude appears at the adjustable tap of the potentiometer 47. As a result a combined adjustment of the saturation and of the contrast of the picture to be displayed is possible with the aid of the potentiometer 47. The luminance signal which is not adjustable in amplitude is supplied through the output 20 to an input 31*a* and the luminance signal which is adjustable in amplitude is supplied through the output 21 to an input 31*b* of a luminance channel 29 in the video section 3. The signal appearing at the output 13 having the adjustable ratio between the reference signal and the color information signal is supplied to an input 23 of a color channel 22 in the video section 3. In the video section 3 the luminance channel 29 handles the luminance signal Y and the synchronization signal S.

For that purpose the channel 29 comprises, for example, the conventional circuits for these signals such as for amplification, synchronization, separation, and time base generation. An output Y supplies the luminance signal for the display section 4 and an output 33 supplies the deflection currents to a deflection device 34 for a display tube 25 in the display section 4. Two outputs 35 and 56 supply keying or time-selection signals. The output 35 supplies the described keying signal to the input 12 of the adjusting device 2 and the output 56 supplies a keying signal to a gate circuit 55 arranged in the color channel 22.

The channel 22 comprises a chrominance amplifier 61 which amplifies the modulated subcarrier supplied to the input 23 and a demodulator and matrix device 63 in which the modulated subcarrier signal amplified in the amplifier 61 is converted into color difference signals R-Y, B-Y and G-Y. Said color difference signals are then supplied to the display tube 25 in the display section 4. From an output 64 of the demodulator and matrix device 63 at which the B-Y color difference signal becomes available, said signal is supplied to the gate 55 in which the demodulated reference signals are keyed out and converted into a control voltage which becomes available at the output 26 of the gate 55 and is supplied for automatic gain control to an input 24 of the amplifier 61. The supply of the control voltage derived from the reference signals is effected independent of the switching device formed by the diode 28 so that the ratio between the reference signal and the color information signal is not influenced and yet remains active for both signals, thus for the entire modulated subcarrier signal.

Although the control voltage in this example, viewed as in the direction of the signal, is supplied after the switching device in the automatic gain control circuit, it is alternatively possible to effect this before the switching device, for example, in the section 1.

In the embodiment shown the adjusting device 2 and the video section 3 are separately drawn for the sake of clarity, although the adjusting device actually forms part of the video section of the receiver.

In the time-dependent transmission in the adjusting device 2, which is formed by the potentiometer resistor 14 and the voltage-dependent impedance 16, the latter may, for example, also be designed as an adjustable resistor of which the end remote from the resistor 14 is connected to ground through a circuit element, for example, a diode or transistor during the occurrence of the color information signal and disconnected from ground during the occurrence of the reference signal. The combination of resistor 14 and impedance 16 is then preferable designed as one potentiometer. When using a diode this serves only as a switching element and not as a voltage-dependent attenuation element.

It will further also be evident that in the embodiment shown also other types of voltage-dependent attenuation elements are suitable to replace the diode 28, such as for example, a transistor having an adjustable impedance. The polarities of the voltages indicated may then be chosen and adapted as required.

In the embodiment shown the contrast adjustment is combined with the saturation adjustment. As will be evident this need not be the case. Also, with the possibility of separate adjustment, the application of the invention gives a great improvement.

Figure 2:
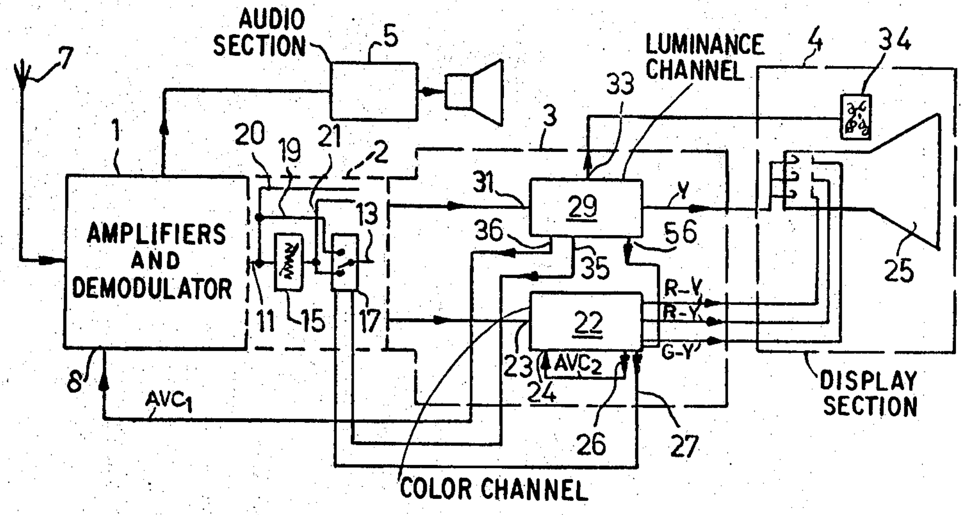
FIG. 2 shows a simplified block diagram of another color television receiver according to the invention, the video signal passing through the transmission channel with the time-dependent transmission.

The block diagram of FIG. 2 in which corresponding parts have the same numerals as in FIG. 1, comprises, in outline a first channel 1, a contrast adjusting device 2, shown as a block in broken lines, a video section 3, a display section 4, and an audio section 5. The display section 4 and the audio section 5 are not important for the understanding of the invention and may be supposed to be sufficiently known to a man skilled in the art, so that they will not be described hereinafter. The first channel 1 has an input 7 through which an RF color television signal may be fed to this channel, and an input 8 for the supply of a first automatic gain control voltage AGC. The first channel 1 also includes the conventional RF and IF amplifying stages (not shown) for amplifying a video signal modulated on a high-frequency carrier, and a demodulating device (likewise not shown) for obtaining a video signal demodulated once. The contrast adjusting device 2 comprises a transmission channel from an input 11 to an output 13, which is shown symbolically. It includes a first signal path extending from the input 11 to the output 13, via a gain control member 15, shown symbolically and uniformly passing all the signal frequencies throughout the frequency band to be passed, and a time-selective element 17 likewise shown symbolically as a changeover switch, and a second signal path extending, outside the control member 15, from the input 11 via the path 19 and the time-selective element 17 to the output 13. The contrast adjusting device 2 may include still further signal paths which are shown symbolically by lines 20 and 21 and the significance of which will be referred to hereinafter. The contrast adjusting device 2 is shown as a transition from the first channel 1 to the video section 3, but may be included either in the first channel 1 or in the video section 3, as will be explained hereinafter. The video section 3 includes a second channel 22 which is fed via an input 23 with the color information signal from the video signal. The second channel 22 includes a chrominance amplifier (not shown) for amplifying the color information signal and the reference signal to said chrominance amplifier is fed via an input 24 a second automatic gain control voltage $AGC_2$. The second channel 22 also includes the conventional circuits (not shown) which are known to a man skilled in the art, such as, for example, demodulators, matrix, color killer, and (possibly) a color subcarrier generator with phase control, for connecting the color information signal into the desired color signals or color difference signals at outputs R-Y, B-Y and G-Y. The color difference outputs R-Y, B-Y and G-Y are connected to control electrodes of a display tube 25 in the display section 4. The second channel 22 also has an output 26 for the supply of a control voltage for its input 24 and an output 27 providing a time-selection signal for the contrast adjusting device 2. The video section 3 also includes a third channel 29 which is fed via an input 31 with the luminance signal from the video signal. The third channel 29 includes the conventional circuits for handling this signal such as, for example, amplification, time-base production and synchronization, which circuits are well known to a man skilled in the art. An output Y provides the luminance signal for the display section 4, and an output 33 provides the deflection currents to a deflection device 34 for the display tube 25. Three outputs 35, 36 and 56 feed respectively a time-selection signal to the contrast adjusting device 2, the first automatic gain control voltage $AVC_1$ to the first channel 1, and a time-selection signal to the second channel 22.

The operation of the receiver will now be explained in so far necessary for the understanding of the invention.

The color television signal received at the input 7 of the aerial is amplified in the first channel 1, demodulated and fed to the second channel 22 and the third channel 29 for further handling. The said color television signal comprises a video signal which is modulated on a carrier. The B-Y signal G-Y a luminance signal and a reference signal and color information signal modulated on a subcarrier. The third channel 29 converts part of the video signal into, for example, a luminance signal Y. The second channel 22 converts an other part of the video signal into, for example, the color difference signals R-Y, B-Y and G-Y. The signals resulting therefrom are fed to a display tube 25 for obtaining a picture. A dual automatic gain control is provided in order that the amplitudes of both the luminance signal Y and the color difference signals R-Y, B-Y and G-Y at the display tube 25 are independent of variations in the input voltages of the aerial. This dual control comprises a first automatic gain control $AVC_1$, the control loop of which extends from the input 8 of the first channel 1, via at least part of this channel and at least part of the third channel 29, through an output 36 back to the input 8 and a second automatic gain control $AVC_2$, the control loop of which extends from an input 24 of the channel 22 through at least part of this channel to an output 26 thereof back to the input 24. The first automatic gain control $AVC_1$ acts on signals having an amplitude preferably independent of the picture content, which signals original originate from the low-frequency portion of the frequency band occupied by the color television signal. Such signals are, for example, the line synchronizing signals or the black level signals, which occur during the blanking period of the horizontal time base. They are referred to here as control signals of the first kind. The second automatic gain control $AVC_2$ acts on signals originating from the high-frequency portion of the said frequency band, which preferably also have an amplitude which is independent of the picture content. By way of example may be mentioned the subcarrier patterns (burst signals) which occur on the so-called back porch of the line-synchronizing pulses during the blanking period in the case of color television signals of the NTSC type or PAL type. With color television signals of the SECAM type, the subcarrier is frequency modulated and its amplitude thus remains constant. If desired, patterns of the color carrier may be taken in the channel 22 at a suitable chosen instant and used for the second automatic gain control. The signals from which the control voltage for the second automatic gain control $AVC_2$ is derived are referred to here as control signals of the second kind. Consequently, the first and second automatic gain controls act in such manner that they endeavor to maintain constancy of the amplitudes of the control signals of the first and the second kind which appear at the outputs of the second channel 22 and the third channel 29. However, to permit control of the contrast of a picture on the display tube 25, the amplitudes of the luminance signal Y and the color difference signals R-Y, B-Y and G-Y must be variable and this in a constant ratio in order to prevent variations in the saturation of the colors displayed. The contrast adjusting device 2 serves to achieve this.

The luminance signal as well as the color information signal and the control signals are passed through the contrast adjusting device 2. The luminance signals and the color information signal are controllable in amplitude in a constant ratio by means of the control member 15, However, to prevent the automatic gain controls from counteracting a control effected by the member 15, the control signals of the first and the second kind are passed by the contrast adjusting device 2 without being influenced. The device 2 includes for this purpose the aforementioned two signal paths. The time-selective element 17 provides for switching on the first signal path which is influenced by the control member 15, during the occurrence of the luminance signal and the color information signal and for switching on the second signal path 19 which is not influenced by the control member 15, during the occurrence of the control signals. It is thus ensured that the contrast can be controlled by one operating member without the automatic gain controls responding to the contrast control.

The contrast adjusting device 2 may be included in the receiver at various locations. If the contrast adjusting device 2 is included in the RF section or IF section of the first channel 1, then the control member 15 may be a valve or transistor an adjusting voltage of which may be varied relative to a level at which the ordinary amplification occurs, by means of manually adjustable potentiometer. The adjusting voltage may be restored to the said level each time the control signals occur by means of an electronic switch. However, the contrast adjusting device 2 will preferably not be included in that section of the first channel 1 through which the audio signal also passes, in order to prevent additional interference voltages in the audio signal circuit. A very advantageous circuit is obtained by including the contrast adjusting device 2 in the video section and hence after the first detector. The control member 15 may then be a potentiometer. It is also possible the control member 15 to be of the dual type and to include one part of in the second channel 22 and the other part in the third channel 29. The design of the time-selective element 17 will then have to be matched accordingly. However, the advantage of being able to control the color and luminance signals in a perfectly constant ratio is then lost more or less. The time-selective element 17 is shown as a changeover switch which is operated by signals from the outputs 35 and 27 and which is present in the channel 11—13, as viewed in the direction of the signals, after the control member 15. However, the selection may alternatively take place by the nature of the signal that passes, for example, by switching over when a given amplitude level is exceeded. Also, the time-selective element 17 may be present, as viewed in the direction of the signals, in front on the control member 15, the input 11 then being connected alternately to a signal path leading to the output 13 which can be influenced or cannot be influenced by the control member 15.

The contrast adjustment above described has the particular advantage that during the period in which the control signals occur, the signals remain uninfluenced by the manual adjustment of the control member 15 in all parts of the receiver. Consequently all the devices in the receiver which utilize these signals can fulfill functions in a very stable manner and need not be designed for a large range of amplitudes. An important example of such a device is a the automatic phase control in receivers for the NTSC system or PAL system, which responds to samples of the color subcarrier (burst signals) which are amplified in the channel 22 and occur during the blanking period of the horizontal time base. Due to the samples appearing at the output of the chrominance amplifier of the channel 22 retaining a constant amplitude irrespective of the contrast control, the phase of the color subcarrier produced in the receiver also remains constant upon contrast control and color shift does not occur.

The contrast adjusting device 2 may also include a signal path shown symbolically and indicated by 20, which continuously passes a signal which is not influenced by the contrast control member 15, and another signal path shown symbolically and indicated by 21, which is continuously influenced by the control member 15. An example of such a device will be described with reference to the following FIGS.

It will further be evident that for satisfactory operation of the contrast control it is not absolutely necessary for the control loops of the automatic gain controls to extend as shown in the FIG. The input 8, which is shown in the channel 1, can also be present after the contrast adjusting device 2, and hence on the side of the video section 3 and, as the case may be, it may even be included in the channel 29. Also, the first automatic gain control voltage $AVC_1$ can be obtained, for example, from the channel 22, in which event the second automatic gain control $AVC_2$ can be active, for example, in the channel 29 only. However, the control loops will preferably extend as shown. The control loop in the second channel is held outside the contrast adjusting device to prevent interaction between the control characteristics of the two control loops. The first control loop maintains a control signal of the first kind at the luminance output at a constant value and the second control loop maintains a control signal of the second kind at the chrominance output at a constant value.

Figure 3:
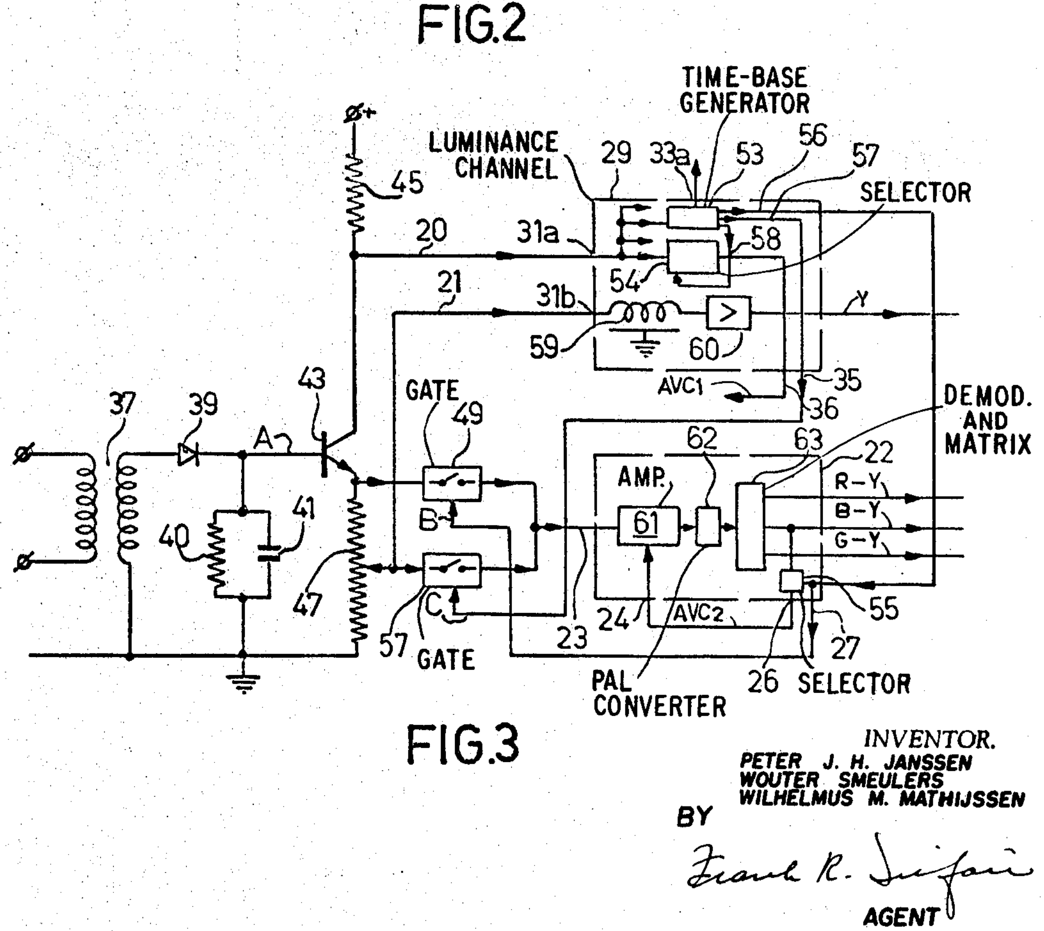
FIG. 3 shows a simplified diagram of a contrast adjustment device and a section of a color television receiver according to the invention which includes this device.

FIG. 3, in which corresponding elements are indicated by the same reference numerals as in FIGS. 1 and 2, shows an IF transformer 37 which is connected to a video detector diode 39. The other side of the diode 39 is connected to a resistor 40, a capacitor 41 and the base of a transistor 43. The collector of transistor 43 is connected to a resistor 45, the other side of which is coupled to a supply voltage source, and via a lead 20 (see FIG. 1) to an input 31*a* of the third channel 29. The emitter of transistor 43 is connected to one end of a potentiometer 47 serving as a contrast control, which end is connected to an input of a gate circuit shown symbolically and indicated by 49. The manually adjustable tap on the contrast control 47 is connected via a lead 21 (see FIG. 2) to an input 31*b* of the third channel 29 and to an input of a second gate circuit 51. The outputs of the gate circuits 49 and 51 are connected together and to an input 23 of the second channel 22. The other inputs of the gate circuits 49 and 51 are connected respectively to the output 27 of the second channel 22 and the output 35 of the third channel 29, so that the said gates can receive operating signals from these channels. The transistor 43, the resistor 45, the contrast control 47 and the gates 49 and 51 together constitute the contrast adjusting device which is illustrated by a simplified embodiment in FIG. 4. The channel 29 is shown in FIG. 3 a little more detailed than in FIG. 2, and comprises, starting from the input 31*a*, a horizontal time-base generator 53 having an output 33*a* for feeding the horizontal deflection current to the deflection unit and a plurality of further outputs 56,57,58 for feeding the operating signals to a first selector 54, a second selector 55 (in channel 22) and the gates 49 and 51. The selectors 54 and 55 serve to scan at the correct instants the AGC control signals which become available at the outputs 36 and 26 of the third and second channels 29 and 22 respectively. The third channel 29 includes, viewed from the input 31*b* a delay line 59 and a luminance amplifier 60 which provides the luminance signal Y. The channel 22 includes, viewed from the input 23, a chrominance amplifier 61, a PAL signal converting device 62, if the relevant receiver is suitable for the PAL system, and a color demodulator and matrix stage 63, the outputs of which provide the color difference signals R-Y, B-Y and G-Y. The output B-Y of the color demodulator stage 63 is connected to the selector 55 at the output of which the second automatic gain control voltage $AVC_2$ becomes available and which output is connected to the control input 24 of the chrominance amplifier 61.

The operation of the circuit arrangement, insofar important for the understanding of the invention, will now be explained. A video signal A which has been detected once by the video detector 39 (see also FIG. 5*a*) is fed to the base transistor 43. This video signal appears via the emitter at the end of the contrast control 47 and at the input of the gate 49. At this area the amplitude thereof is independent of the adjustment of the contrast control 47. The video signal appears in more or less attenuated form at the manually adjustable tap on the contrast control 47 and at the input of the gate 51. The gates 49 and 51 alternately transmit the signal from the end of the contrast control 47 or the signal from the tap thereof to the input of the chrominance amplifier 61. The signal path is through connected via the gate 49 during the occurrence of the burst signals, and is through connected the one via the gate 51 during the occurrence of the color information signals. The chrominance amplifier 61 is thus alternately fed with a signal which is not attenuated and one which has been attenuated. The unattenuated signal is the burst signal and provides the control voltage for the automatic gain control of the chrominance amplifier 61. To this end, the B-Y output of the demodulator 63 includes a selector 55 which passes the demodulate burst signal and uses it for producing the control voltage. The selector 55 is operated simultaneously with the gate 49 by a signal originating from the output 56 of the horizontal time-base generator 53, By means of the gate circuits 49 and 51 the automatic gain control of the chrominance amplifier 61 responds only to the amplitude of the burst signal and does not respond to that of the color information signal. The latter is thus adjustable without influencing the automatic gain control. It will now be explained that this is also true of the luminance signal. From the tapping on the contrast control 47, a signal is fed to the luminance amplifier 60, which signal has invariably been attenuated in the same proportion as the signal fed to the chrominance amplifier 61. The control of the contrast thus cannot influence the ratio between the luminance signal Y at the output of the luminance amplifier and the color difference signals R-Y, B-Y and G-Y at the output of the matrix, since no automatic gain control derived from these signals is active. In fact, the automatic gain control $AVC_1$, which becomes available on the output 36 from the channel 29, is also independent of the adjustment of the contrast control 47 since this signal is derived from the collector of transistor 43. Then it is scanned at the correct instants via the input 31*a* by the selector 54 (for example on the peaks of the line-synchronizing pulses, or on the front or back porches thereof if a control on the black level is desired and converted into an $AVC_1$ voltage. The voltage at the collector of transistor 43 does not vary due to the variation in the adjustment of the contrast control 47, and therefore, neither does the amplification of the signal circuit in which the automatic gain control is active. The gates 49 and 51 may be operated, for example, by signals as shown in FIG. 5b and FIG. 5c and may be designed as will be described with reference to FIG. 4.

Figure 4:
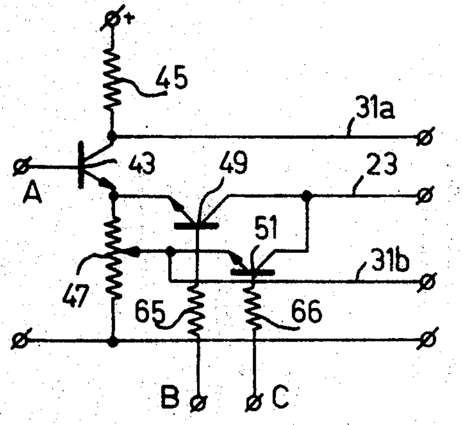
FIG. 4 shows a simplified circuit diagram of the contrast adjustment device of FIG. 3.
Figure 5:
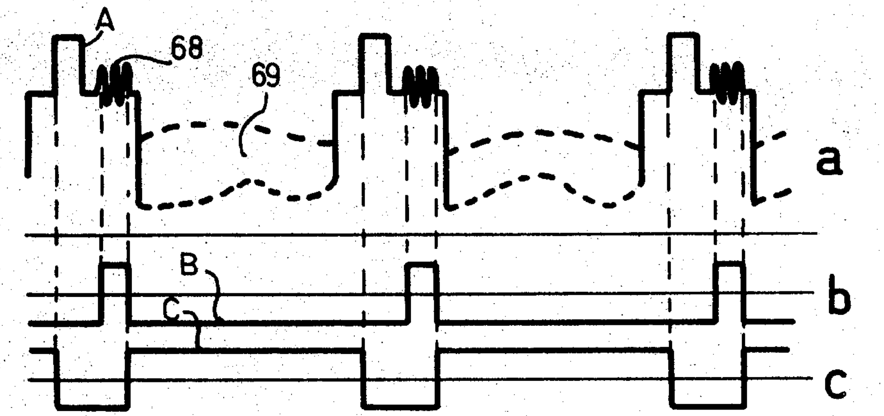
FIG. 5 shows the amplitude-time diagrams of the switching pulses (FIGS. *5b* and *5c* ) for the contrast adjustment device of FIG. 4 as compared with those of a video signal which has been detected once (FIG. *5a* ).

FIG. 4 shows a circuit of a contrast adjusting device for a receiver according to the invention in a simplified manner. The reference numerals for corresponding elements are the same as those of the previous FIGS, to which reference is made insofar is the description thereof not given hereinafter. The gates 49 and 51 are now designed as transistors the bases of which are fed via resistors 65 and 66 with voltages B and C, which are shown diagrammatically in FIGS. 5b and 5c in their location relative to the complete video signal A shown in FIG. 5a and which is fed to the base of transistor 43 in the contrast adjusting device of FIG. 3. The transistors conduct when their bases are positive relative to their collectors and emitters and do not conduct when their bases are negative relative thereto. During the occurrence of a burst signal 68, the transistor 49 conducts and the transistor 51 is cut off. The voltage applied to B is then positive and the voltage applied to C is negative (see FIGS. 5a, 5b and 5c). The transistor 51 conducts and the transistor 49 is cut off when the voltage applied to C is positive and the voltage applied to B is negative. This is the case during the occurrence of a color information signal 69 (see FIGS.5a, 5b and 5c). It should be noted that the FIGS. 5a, 5b and 5c for the sake of clarity are not relatively drawn to scale as far as the amplitudes of the signals A, B and C are concerned.

In the embodiments described the coupling between the output 13 of the transmission channel and the input of the amplification element in the chrominance amplifier 61, on which an automatic gain control voltage is active, must be such that at said amplifier element the zero levels of the reference signal and the color information signal are substantially equal. This is generally the case if said coupling substantially does not pass possible signals having frequencies below the lowest frequency limit of the color signal.

We claim:

1. A color television amplitude control circuit for a composite video signal containing a luminance signal, a synchronization signal, a color information signal, and a color burst reference signal, said circuit comprising means for receiving said video signal and providing luminance, synchronization, color information, and color burst output signals; means for detecting said output synchronization signal coupled to said receiving means; a color channel having an input coupled to receive said information and burst output signal and an output, said channel comprising means for signal attenuating having an input coupled to said channel input and an output, alternative switching means coupled to said attenuation means for alternatively coupling said attenuation means to said color channel during the occurrence of said color information signal, means having an input coupled to said attenuation means output for linearly amplifying said color information and burst signals, and means coupled to said amplifying means for controlling the amplitude of both said burst and color information signals in said color channel by controlling the amplification of said amplifying means by the occurrence of said burst reference signal; means coupled to said detecting means for generating an enable signal from said detected synchronization signal; and means for applying said enable signal to said controlling means and said attenuation means.

2. A circuit as claimed in claim 1 wherein said attenuation means comprises a diode reversed biased during the duration of said enable signal and forward biased during the remaining time.

3. A circuit as claimed in claim 2 further comprising a transistor amplifier coupled to receive said luminance and synchronization signal, and a potentiometer coupled to the emitter of said transistor amplifier and having a center tap coupled to said diode.

4. A circuit as claimed in claim 1 wherein said color channel further comprises first and second signal paths, said first path including said attenuation means, and means for combining the outputs of said signal paths coupled to the input of said linear amplifying means.

5. A circuit as claimed in claim 4 further comprising a transistor amplifier coupled to the output of said receiving means, a potentiometer coupled to the emitter of said transistor, said attenuation means comprising a tap on said potentiometer coupled to said first signal path, the emitter of said transistor being coupled to said second path, and said switching means comprising first and second gates coupled in said first and second paths respectively.